(12) United States Patent
Shrivathsan et al.

(10) Patent No.: US 8,751,146 B2
(45) Date of Patent: Jun. 10, 2014

(54) NAVIGATION SYSTEM HAVING LOCATION BASED SERVICE AND TEMPORAL MANAGEMENT

(75) Inventors: Musiri Shrivathsan, Sunnyvale, CA (US); David Chiu, Cupertino, CA (US)

(73) Assignee: Telenav, Inc., Sunnyvale, CA (US)

(*) Notice: Subject to any disclaimer, the term of this patent is extended or adjusted under 35 U.S.C. 154(b) by 149 days.

(21) Appl. No.: 11/897,314

(22) Filed: Aug. 30, 2007

(65) Prior Publication Data

US 2009/0063038 A1 Mar. 5, 2009

(51) Int. Cl.
*G06F 7/00* (2006.01)

(52) U.S. Cl.
USPC ........... 701/408; 701/117; 701/423; 701/519; 701/533; 340/995.19; 340/601; 340/905; 340/286.06; 340/286.02

(58) Field of Classification Search
USPC ......................................................... 701/200
See application file for complete search history.

(56) References Cited

U.S. PATENT DOCUMENTS

| | | | |
|---|---|---|---|
| 6,107,944 A | 8/2000 | Behr et al. | |
| 6,845,241 B2 | 1/2005 | Edlund et al. | |
| 6,850,980 B1 * | 2/2005 | Gourlay | 709/226 |
| 6,912,398 B1 | 6/2005 | Domnitz | |
| 7,385,479 B1 * | 6/2008 | Green et al. | 340/286.02 |
| 7,898,438 B2 * | 3/2011 | Brosius, III | 340/995.27 |
| 8,024,112 B2 * | 9/2011 | Krumm et al. | 701/423 |
| 8,060,297 B2 * | 11/2011 | Couckuyt et al. | 701/432 |
| 8,090,532 B2 * | 1/2012 | Tashev et al. | 701/433 |
| 8,131,736 B1 * | 3/2012 | Chang et al. | 707/751 |
| 8,155,872 B2 * | 4/2012 | Kjeldsen et al. | 701/425 |
| 8,185,299 B2 * | 5/2012 | Fujiwara et al. | 701/423 |
| 2001/0034786 A1 * | 10/2001 | Baumeister et al. | 709/231 |
| 2002/0022945 A1 * | 2/2002 | Takayasu et al. | 702/186 |
| 2003/0069683 A1 * | 4/2003 | Lapidot et al. | 701/117 |
| 2003/0229441 A1 | 12/2003 | Pechatnikov et al. | |
| 2005/0021972 A1 * | 1/2005 | Levi et al. | 713/176 |
| 2005/0251326 A1 * | 11/2005 | Reeves | 701/200 |
| 2005/0256781 A1 | 11/2005 | Sands et al. | |
| 2006/0241862 A1 * | 10/2006 | Ichihara et al. | 701/209 |
| 2006/0270421 A1 | 11/2006 | Phillips et al. | |
| 2007/0078810 A1 * | 4/2007 | Hackworth | 707/2 |
| 2007/0168168 A1 * | 7/2007 | Maegawa et al. | 703/6 |
| 2008/0194926 A1 * | 8/2008 | Goh et al. | 600/301 |
| 2008/0307495 A1 * | 12/2008 | Holtzman et al. | 726/2 |
| 2009/0063038 A1 * | 3/2009 | Shrivathsan et al. | 701/207 |

FOREIGN PATENT DOCUMENTS

| | | | | |
|---|---|---|---|---|
| CN | 1507553 A | 6/2004 | | |
| EP | 1324291 A2 * | 7/2003 | ........... | G08G 1/0962 |
| EP | 1422501 A1 | 5/2004 | | |
| EP | 1610093 A1 | 12/2005 | | |

OTHER PUBLICATIONS

First Office Action for CN Application No. 200880104121.3 dated Oct. 23, 2011.

* cited by examiner

*Primary Examiner* — Redhwan K Mawari
(74) *Attorney, Agent, or Firm* — IP Investment Law Group

(57) ABSTRACT

A method of operating navigation system having location based services and temporal management comprising selecting a temporal component including a time of interest in a client, a server, or a combination thereof; filtering navigation and location based information with the temporal component by the client, the server, or a combination thereof, for forming time of interest relevant information; and communicating the time of interest relevant information between the client and the server for display by the client.

20 Claims, 3 Drawing Sheets

NAVIGATION SYSTEM HAVING LOCATION BASED SERVICE AND TEMPORAL MANAGEMENT

BACKGROUND INFORMATION

1. Field of Invention

The present invention relates generally to a navigation system, and more particularly, to a method and system for a navigation system having location based services.

2. Description of Related Art

Rapid growth in consumer electronics is evident with mobility as a ubiquitous feature. Consumer electronics products, such as music players, digital camera, personal digital assistant (PDA), cellular phones, and notebooks, offer means for users to create, transfer, store, and consume information almost anywhere, anytime.

One consumer electronics growth, where mobility is quintessential is in location based services, such as navigation systems utilizing satellite-based Global Positioning System (GPS) devices. Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest. The real-time information provides invaluable relevant information, when available or in service areas. The relevant information is also invaluable when service is not available, as well.

Currently, there are mainly two types of navigation system having location based services. One is client based navigation system. All map content, location based services, and navigation software are stored on the client. And the client based navigation system can be specially designed standalone GPS navigation units, normally called Personal Navigation Device (PND), with large memory device to store maps, location based services, etc. on board; or using standard PDA or smart phone with memory card. The second one is thin client and server based navigation system. This is very typical of cellular phone based navigation system. In this case, the map data, location based services, and other Points of Interest (POI) data are stored at server. The data is loaded to the phone to provide navigation service through the phone, each time its user requests the navigation service.

The drawback of the client based navigation system is the inconvenience to update data or information. Also, it is more costly and typically larger in size since it needs larger memory to store large amount of information, such as maps and POI data. Because of limitation of the memory card, and the large data size such as for the street audio prompts, the typical standalone navigation device does not provide audio street name prompts. Another drawback is that some information, such as traffic routes, may be dynamic or updated in a predetermined manner while others are static, such as location based services or other points of interest. The advantage is that it can be used in areas without wireless coverage, because it does not depend on wireless service as the thin client navigation system.

The drawback of the thin client navigation system is that it always needs a wireless network to load the map information to the client to navigate. So when there is no network, the user is then unable to access the navigation service. Another drawback, as mentioned earlier, is that some information, such as traffic routes, may be dynamic or updated in a predetermined manner while others are static, such as location based services or other points of interest.

The advantage of the thin client system is that its map data is always updated because it can be done at server by the service provider, rather by users. Also the static POI data can be updated as well from server depending upon route and location. It can also provide other real time information to the thin client through wireless network, such as gas price or weather information. Also since all street audio prompts are stored at server, the thin client system can play audio street prompts, because they are loaded to the phone together with map and route information when the user requests the navigation services.

Although conventional navigation systems download present, real-time navigation data information, the conventional systems do not present convenient and meaningful information from the typical massive data downloaded of the current system. A navigation system is needed to address above drawbacks of either client based system or thin client based system, and at the same time take advantage of the merits of both systems.

SUMMARY OF THE INVENTION

The present invention comprises a method of operating a navigation system having location based services and temporal management comprising selecting a temporal component including a time of interest in a client, a server, or a combination thereof, filtering navigation and location based information with the temporal component by the client, the server, or a combination thereof, for forming time of interest relevant information; and communicating the time of interest relevant information between the client and the server for display by the client.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

Figure 1:
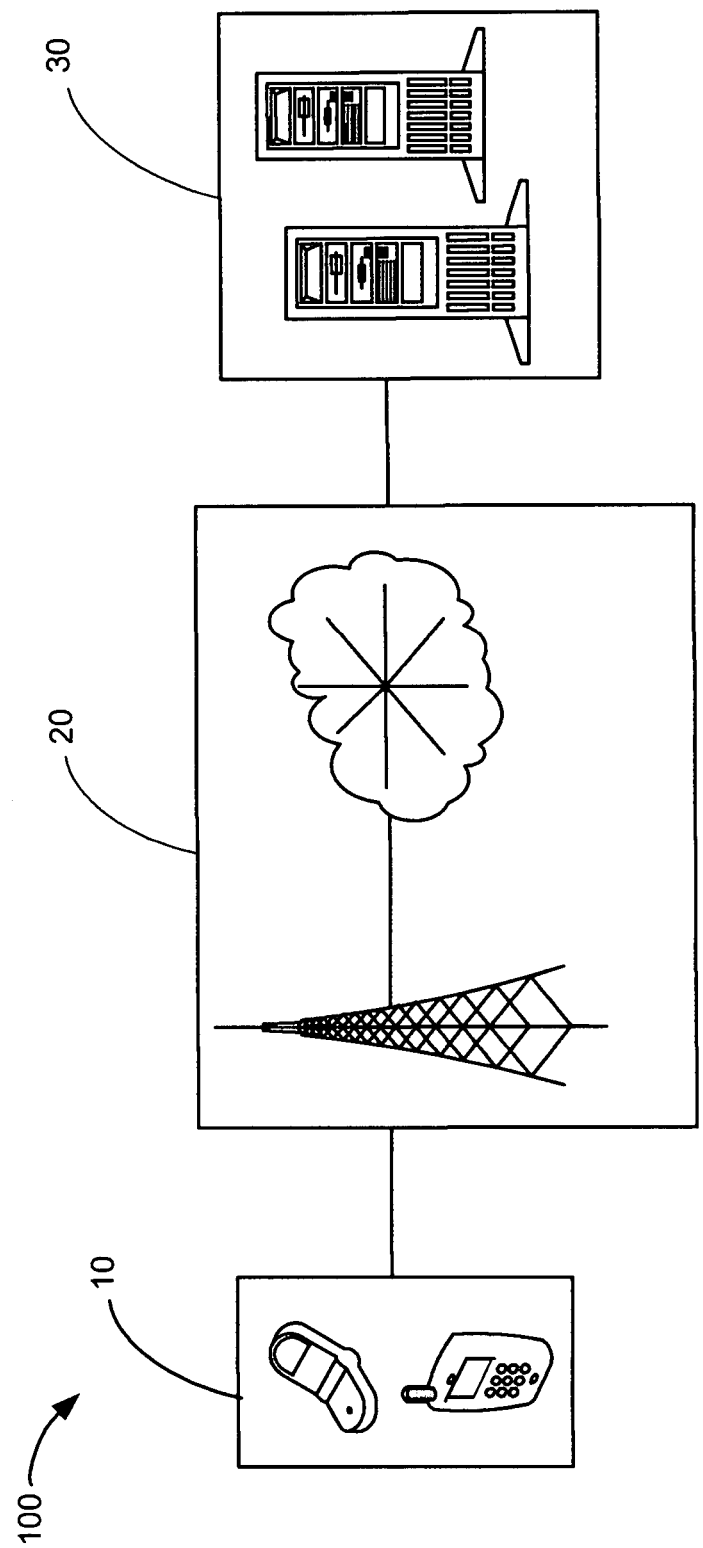
FIG. 1 is an architectural diagram a navigation system having location based service and temporal management in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGS.

In addition, where multiple embodiments are disclosed and described having some features in common, for clarity and ease of illustration, description, and comprehension thereof, similar and like features from one figure to another will ordinarily be described with like reference numerals. The following embodiments are described in sufficient detail to enable those skilled in the art to make and use the invention. It is to be understood that other embodiments would be evident based on the present disclosure, and that system, process, or mechanical changes may be made without departing from the scope of the present invention.

One component of a navigation system is the determination of the navigation information (or position) of a user. It is intended that the term navigation information referred to herein comprises a geographic location or geographic information relating to the position of an object. The navigation information may contain three-dimensional information that completely defines the substantially exact position of an object. In some additional embodiments, the navigation information may contain information that is not sufficient to completely define the position of an object. Broadly defined, as used herein, the navigation information also may include speed, time, direction of movement, etc. of an object.

One skilled in the art would appreciate that the format with which navigation information is expressed is not critical to some embodiments of the invention. For example, in some embodiments, navigation information is presented in the format of (x, y), where x and y are two ordinates that define the geographic location, i.e., a position of a user. In an alternative embodiment, navigation information is presented by longitude and latitude related information. In another embodiment of the present invention, the navigation information also includes a velocity element comprising a speed component and a heading component.

Referring now to FIG. 1, therein is shown an architectural diagram of a navigation system 100 having location based services and temporal management in an embodiment of the present invention. A client 10 is coupled to a communication path 20, such as a wireless telecommunication network, that communicates with a server 30. As used herein, the client 10 can be of any of a variety of mobile devices, such as a cellular phone, a notebook computer, other multi-functional mobile communication, or entertainment devices having means to couple to the communication path 20 to communicate with the server 30. Preferably, the client 10 includes a global positioning system (GPS) function means for client location monitoring.

The client 10 includes, for example, a control device (not shown), such as a microprocessor, software (not shown), a memory, cellular components (not shown), navigation components (not shown), and a user interface. The user interface, such as a display, a key pad, and a microphone, and a speaker, allows the user to interact with the client 10. The microprocessor executes the software and provides the intelligence of the client 10 for interaction with the server 30 for receiving relevant information from the server 30, the user interface, interaction to the cellular system of the communication path 20, and interaction to the navigation system of the communication path 20, as well as other functions pertinent to a location based service communication device.

The memory, such as volatile memory, nonvolatile memory, internal memory, inserted external memory, or a combination thereof, may store the software, setup data, and other data for the operation of the client 10 as a location based service communication device. The memory may also store, or preload, relevant information from the server 30, such as temporal stamped information, including maps, route information, traffic information, businesses, and points of interest (POI). For illustrative purpose, the functions of the client 10 may be performed by any one in the list of software, firmware, hardware, or any combination thereof. The cellular components are active and passive components, such as microelectronics or an antenna, for interaction to the cellular system of the communication path 20. The navigation components are the active and passive components, such as microelectronics or an antenna, for interaction to the navigation system of the communication path 20.

As used herein, the communication path 20 can be of any of a variety of networks. For example, the communication path 20 may include wireless communication, wired communication, or the combination thereof Satellite communication, cellular communication, wireless fidelity (WiFi), and worldwide interoperability for microwave access (WiMAX) are examples of wireless communication that may be included in the communication path 20. Ethernet, digital subscriber line (DSL), fiber to the home (FTTH), and plain old telephone service (POTS) are examples of wired communication that may be included in the communication path 20. Further, the communication path 20 may traverse a number of network topologies and distances. For example, the communication path 20 may include personal area network (PAN), local area network (LAN), metropolitan area network (MAN), and wide area network (WAN).

A key component of the navigation system 100 having location based service and temporal management is providing relevant information for an user of the client 10, particularly time relevant information, such as information associated with time of interest (TOI) for the user. It is intended that the term TOI relevant information relating to navigation information, information relating to points of interest to the user, such as local business information, hours of businesses, types of businesses, advertised specials, traffic information, maps, local events, and nearby community or personal information etc.

Figure 2:
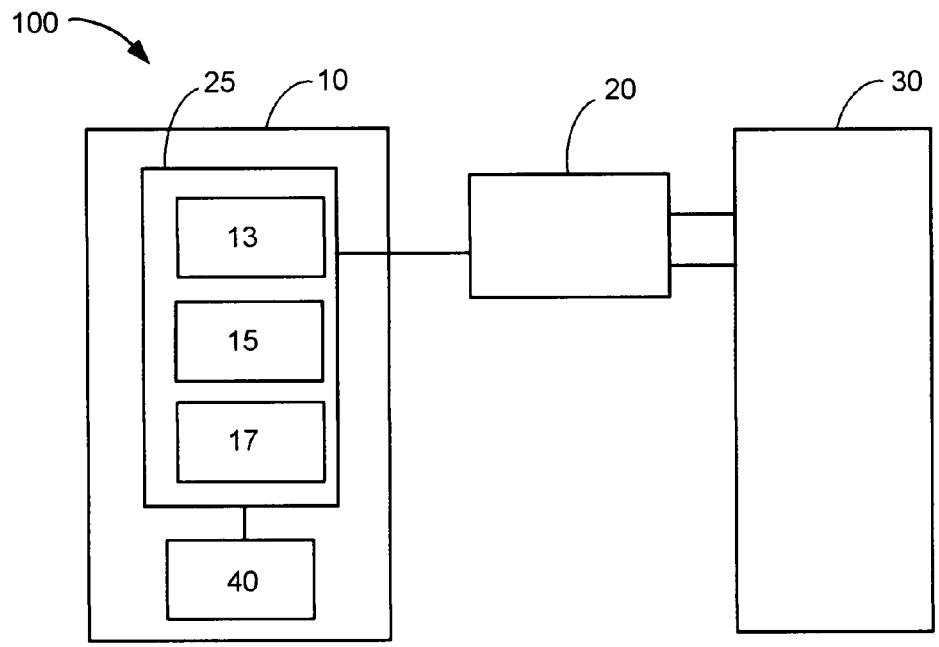
FIG. 2 is a block diagram of the navigation system having location based service and temporal management of FIG. 1.

Referring now to FIG. 2, therein is shown a block diagram of the navigation system 100 having location based service and temporal management of FIG. 1. The client 10 couples to the communication path 20 to communicate with the server 30 over the communication path 20 to receive temporal stamped local content, such as described above, to be stored in a local content cache 15 of the client. As mentioned above in FIG. 1, the memory function of the local content cache 15 can be implemented in a number of ways. For example, the local content cache 15 may be a nonvolatile storage such as non-volatile random access memory (NVRAM) or a volatile storage such as static random access memory (SRAM).

As an example, the navigation system 100 having location based service and temporal management comprises having the server 30 provide the client 10 with temporal stamped local content corresponding to a location of the client to maintain TOI relevant information in the client 10. The temporal stamped local content stored in the client 10 is temporally filtered to provide TOI relevant information for a predetermined route or location based on a selected time, day, date of travel, or other time of interest. The temporal stamped local content in the navigation system 100 may be adaptively set to update or store temporal stamped local contents from the server 30 depending on a temporal component, such as for example, whether the time associated with a navigation request, or the time of interest, occurs during heavy traffic times or during non-peak travel times. Additionally, temporal stamped local content updating from the server 30 provides the user of the client 10 more accurate and time relevant location based services, such as traffic, navigation, businesses, and other local information data as part of the time of interest relevant information provided by the navigation system 100.

In another example, updating and storing within the client 10 temporal stamped local content from the server 30 would, for example, facilitate a user traveling to update the client 10 upon arrival, or preload client 10 prior to departure, TOI relevant information local to the location of the client 10 upon arrival at a destination, or preloaded with that TOI relevant information local to the selected destination before departure. Accordingly upon arrival, the client 10 has available for the user local content information, including local routes, holidays, business hours, languages, customs, which affect navigation or points of interest information provided by the client 10, including when local stores are closed, or normal working days and hours as to when the local stores open for business.

In a typical operation client initiated server request update operation, a client controller 25 of the client 10 sends a server request 13 to the server 30 to update a location relevant information stored in a local content cache 15 of the client 10. The server request 13 typically includes a temporal component and a location component. The temporal component comprises a cache update time, such as a time corresponding to the server request 13 or a specified time entered by a user of the client 10. The location component may comprise the location of the client 10 at the time of the server request 13, or a specified location entered by a user of the client 10. The server 30 may be set to send client 10 a temporal stamped local content based on the server request 13, wherein the temporal component may be from the client for a specified time, or at the time of the server request 13. Alternatively, the server 30 may be set to update the client 10 automatically based on an elapsed time between the time component and the time of the last update of the local content cache 15. The client 10 receives from the server 30 over the communication path 20 the temporal stamped local content comprising TOI relevant information associated with the temporal component and the location component specified in the server request 13, which is stored to update the local content cache 15.

In another option, the client 10 may be preset to automatically send server request 13 during a predetermined temporal range such as, for example, at a preset interval between rush hours, at an estimated arrival time at a location selected by a user of the client 10. In yet another option, such as in the case of a user of the client 10 traveling, the client 10 may be set to request the server 30 to preload the local content cache 15 with a temporal stamped local content for a specified time and a specified location selected by the user of the client 10.

The local content cache 15 having the temporal stamped local content comprises updated TOI relevant information, preferably including, for example, city information, streets or map information, local language, food, businesses, and other location-based information within a predefined distance from a location requested by the client 10, or determined from a position of the client 10. The temporal stamped local content provided by the server 30 also comprises a cache temporal component, the cache temporal component indicating a cache update time corresponding to when the local content cache 15 is updated.

In addition, the client 10 preferably further comprises a temporal filter for filtering or sorting the temporal stamped local content to generate TOI relevant information in response to a user of the client 10 for location based information, such as for navigation application or business information requests associated with a location and a time entry by the user of the client 10. As referenced earlier, navigation and travel routes sent by the server 30 to the client 10 may have a number of travel routes from which to select a preferred navigation route based on the time, day, date, or a combination thereof. Also mentioned earlier as an example, the location based services sent by the server 30 to the client 10 may have a number of location based services information sets from which to select a preferred location based services based on the time, day, date, or a combination thereof for a location requested by an user of the client 10, or the location of the client 10 at the time of request.

In another option, temporal filtering or sorting may be done by the server 30 such that the relevant TOI information sent by the server 30 to the client 10 may already be temporally filtered. Preferably, the client 10 further filters the relevant TOI information received from the server 30 to generate a further relevant TOI information that may be more meaningful for the user. In yet another option, both the client 10 and the server 30 may perform complete, or partial, temporal filtering based on a set of conditions, such as at specified update events, in response to a setting change in the client 10 or a setting change in the server 30.

The local content cache 15 is accessed by the temporal filter 17 of the client controller 25 in performing search requests relative to a location of the client and a temporal component, such as the time of the request, or for a specified time entered by a user of the client 10. The client 10 then displays the search results on a display 40 of the client 10. For example, in a navigation application by the client 10, the temporal stamped local content stored in the local content cache 15 is used for controlling the operation of the display 40 to display TOI relevant navigation route data calculated by the client 10. Although as illustrated herein the local content cache 15 is used by the client 10 for controlling the operation of the display 40, it is understood that the local content cache 15 can be used by the client 10 for applications controlling an audio output (not shown) of the client 10.

Figure 3:
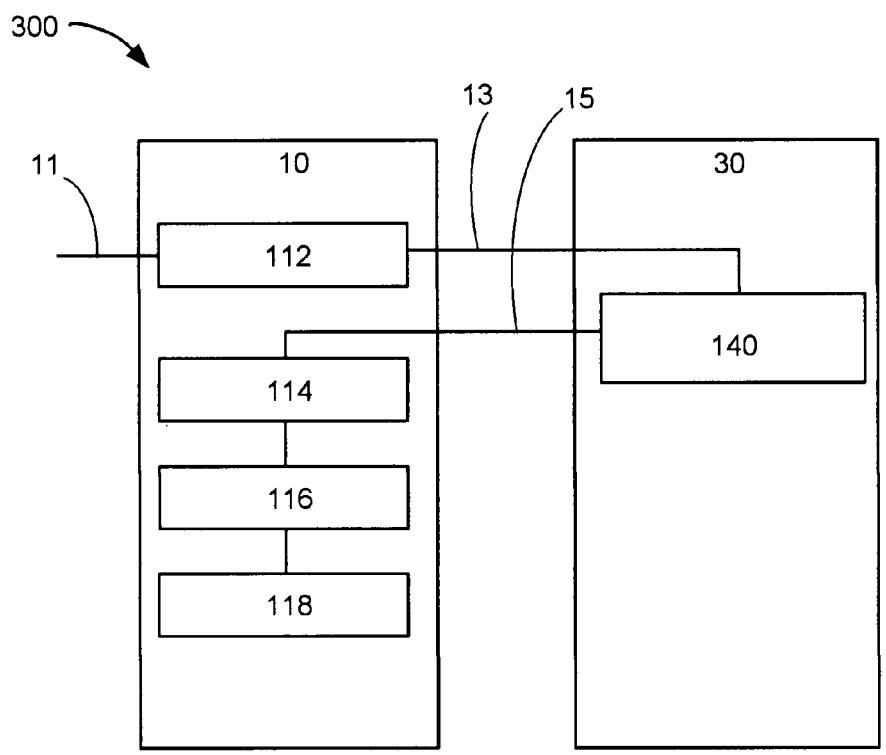
FIG. 3 is a flow chart of the location based service and temporal management of FIG. 1.

Referring now to FIG. 3, therein shown is a flow chart 300 of the navigation system having location based services and temporal management in an embodiment of the present invention 100 of FIG. 1. In operation, for example, the client 10 receives an information request 11 from a user of the client 10 entered via an input means (not shown), such as a key pad of a cellular phone. The information request 11 includes a temporal component, such as a user specified time, present, past, or in the future. In another embodiment, client 10 checks a temporal component and a location component of the client 10, which comprises comparing an elapsed time between a specified cache update time for the location component, such as the time associate with the entry of the information request 11, and a last cache update time associated with the time of the last local content cache update for the location. For example, if the elapsed time is greater than a preset range, then the client sends the server request 13 to the server in a block 112.

In another embodiment, the server 30 checks the server request 13 for the temporal component and sends the client 10 temporal stamped local content corresponding to the temporal component and a location component in a block 140. The server request 13 comprises a temporal component from the client corresponding to a time component in the information request 11. Similar to the operation of the client 10 described above, the server 30 checks the temporal component in the server request 13 to determine if there is a user specified time, or if the elapsed time is greater than a preset range. In one embodiment, the server 30 provides TOI relevant information based on the user specified time. In another embodiment, if the elapsed time is greater than a preset range, the server sends the client a temporal stamped local content corresponding to the location component from the client in the block 140.

The client then stores the temporal stamped local content from the server in the local content cache in a block 114. Preferably, the client performs a temporal filtering of the local content cache to generate a set of TOI relevant information in response to the information request 11 in a bock 116. The client then controls the output means of the client, such as a display or an audio output, utilizing the set of TOI relevant information in a block 118.

A temporal filtering of the local content cache generates TOI relevant information from the temporal stamped local content information in the local content cache 15 in the block 118, such as for application relating to navigation, local business or POI information requests, or in generating a local user-interface to display on the display 40 of the client 10 shown in FIG. 2.

Temporal filtering may be a selectable feature in the client 10, the server 30, or a combination thereof The temporal filtering feature may be selected in the client 10 or the server 30 independent of each other. For example, the server 30 may send relevant information to the client 10 with business hours of local business at a location of interest requested by the client 10. The client 10 may perform the temporal filtering of the relevant information received based on a past time, a future time, or a combination thereof. For example, the user may enter an estimated time of arrival at a predetermined location. Temporal filtering provides, in response, TOI relevant information such as of businesses with available business hours for the estimated time of arrival, day, date, or a combination thereof The server 30 may also perform the temporal filtering of the relevant information based on information from the client 10 of the estimated travel route, time, day, date, or a combination thereof, to a predetermined location calculated by the server 30 to send to the client 10.

Temporal filtering may also be selectable by parts or may be applied to a portion of the relevant information but not to others. For example, temporal filtering may be applied to the travel routes by the client 10, the server 30, or a combination thereof and not necessarily to a predetermined location or region. Temporal filtering may have a selectable granularity that is predetermined or selectable. For example, a predetermined number of travel routes along with points of interest along those travel routes may be temporally filtered for different time, day, date, or a combination thereof for a user of the client 10 to view and select, including the option of a future time, a past time, or a combination thereof.

Temporal filtering may also be invoked upon selectable events. For example, temporal filtering may also be invoked by update events, such as for periodic updates, scheduled updates, predetermined update locations, or server initiated update as in weather or traffic condition change. Another example, temporal filtering may be invoked by entering or exiting a predetermined geographic region or zone, sometimes referred to as geo-fence.

In yet another embodiment, the navigation system 300 having location based services and temporal management, the server 30 may detect the client position automatically using GPS data information transmitted by the client at the time of the request, or alternatively, the server may calculate the client position from positional data transmitted by the client.

Figure 4:
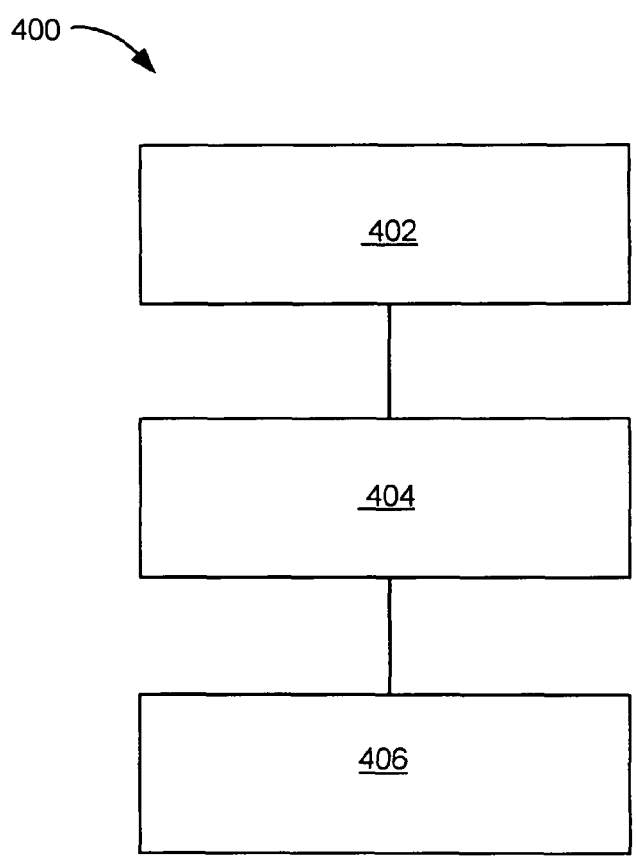
FIG. 4 is a flow chart of the location based service and temporal management of FIG. 1 in a second embodiment of the present invention.

Referring now to FIG. 4, therein is shown a flow chart 400 of a navigation system having location based service and temporal management in yet another embodiment of the present invention. The method of operating navigation system 400 having location based services and temporal management comprises selecting a temporal component including a time of interest in a client, a server, or a combination thereof in a step 402; filtering navigation and location based information with the temporal component by the client, the server, or a combination thereof, for forming time of interest relevant information in a step 404; and communicating the time of interest relevant information between the client and the server for display by the client in a step 406.

It has been discovered that the present invention improves usefulness of the client, such as providing automatic updating of the client with more accurate and useful geographic data synchronized with a temporal component, such as past, present or future as specified by the client, and a locality component to generate TOI relevant information. Alternatively, the invention can also automatically detect the time and distance of the client movement to determine whether to update a local cache of the client. The local cache can be updated with geographical data for navigation applications, as well as local geographical information, such as for example, businesses, points of interests, language information, or other human interest information associated with the client region. Moreover, another aspect of the invention is to provide a more meaningful user interface that is tailored for a particular geographical region based on a client specified temporal and location component, such as preloading the client with TOI relevant information for anticipated travel to a different geographical locale during a specified holiday, for example.

Yet another important aspect of the present invention is that it advances and services the historical trend of increasing functions and performance in mobile consumer products. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

We claim:

1. A method of operating navigation system having location based services and temporal management comprising:

selecting a temporal component for identifying a time of interest for a client, a server, or a combination thereof;

sending a server request based on comparing an elapsed time between a specified cache update time and a last cache update time;

receiving a temporal stamped local content, with a control device, corresponding to the temporal component at the time of the server request;

updating a local content cache based on the temporal stamped local content indicating a cache update time for when the local content cache is updated;

filtering the temporal stamped local content with the temporal component for forming time of interest relevant information; and communicating the time of interest relevant information for displaying the local content cache by the client.

2. The method as claimed in claim 1 further comprising further filtering the time of interest relevant information for generating a further time of interest relevant information.

3. The method as claimed in claim 1 wherein filtering the temporal stamped local content with the temporal component comprises generating the time of interest relevant information from the temporal stamped local content.

4. The method as claimed in claim 1 wherein communicating the time of interest relevant information comprises storing the time of interest relevant information in the local content cache.

5. The method as claimed in claim 1 wherein communicating the time of interest relevant information comprises information relating to a future time, a past time, or a combination thereof.

6. A method of operating navigation system having location based services and temporal management comprising:
    selecting a temporal component for identifying a time of interest for a client, a server, or a combination thereof;
    sending a server request based on comparing an elapsed time between a specified cache update time and a last cache update time;
    receiving a temporal stamped local content, with a control device, corresponding to the temporal component at the time of the server request;
    updating a local content cache based on the temporal stamped local content indicating a cache update time for when the local content cache is updated;
    filtering temporal stamped local content with the temporal component for forming time of interest relevant information;
    communicating the time of interest relevant information to the client; and
    storing the time of interest relevant information in the local content cache for displaying by the client.

7. The method as claimed in claim 6 wherein storing the time of interest relevant information further comprises a further filtering of the time of interest relevant information.

8. The method as claimed in claim 6 wherein selecting a temporal component comprises selecting a future time, a past time, or a combination thereof.

9. The method as claimed in claim 6 wherein filtering the temporal stamped local content comprises filtering to form time of interest relevant information including filtering with a future time, a past time, or a combination thereof.

10. The method as claimed in claim 6 further comprising detecting GPS data information in the server request.

11. A navigation system having location based services and temporal management comprising:
    a control device having location based service capability, a local content cache, and a client output means, wherein the control device is for:
        sending a server request based on comparing an elapsed time between a specified cache update time and a last cache update time;
        receiving a temporal stamped local content corresponding the temporal component at the time of the server request, the temporal component including a time of interest selected in a client, a server, or combination thereof;
        updating the local content cache based on the temporal stamped local content indicating a cache update time for when the local content cache is updated; and
    a temporal filter, coupled to the control device, for filtering the temporal stamped local content with the temporal component to generate time of interest relevant information for the client output means.

12. The navigation system of claim 11 wherein the temporal filter is included in the client.

13. The navigation system of claim 11 wherein the temporal filter is for sorting the time of interest relevant information received from the server.

14. The navigation system of claim 11 wherein the temporal filter comprises a temporal input means to a receiver a user controlled temporal entry.

15. The navigation system of claim 11 wherein the client further comprises a GPS function means to detect and monitor a position of the client.

16. The navigation system of claim 11 wherein the client further comprises an input means for receiving an information request entry.

17. The navigation system of claim 11 wherein the client output means comprises a client display.

18. The navigation system of claim 11 wherein the client output means comprises an audio output means.

19. The navigation system of claim 11 wherein the client output means further comprises a user interface controller coupled to a client display.

20. The navigation system of claim 11 wherein the client output means further comprises a user interface controller coupled to control an audio-visual means.

* * * * *